United States Patent [19]

Yonezawa et al.

[11] Patent Number: 4,474,936
[45] Date of Patent: Oct. 2, 1984

[54] POLYESTERAMIDE AND PROCESS FOR PREPARING THE SAME

[75] Inventors: Kazuya Yonezawa; Masahiro Asada; Hiroshi Iwakiri, all of Kobe; Miyuki Azuma, Nishinomiya, all of Japan

[73] Assignee: Kanegafuchi Kagaku Kogyo Kabushiki Kaisha, Osaka, Japan

[21] Appl. No.: 514,200

[22] Filed: Jul. 15, 1983

Related U.S. Application Data

[63] Continuation-in-part of Ser. No. 350,228, Feb. 19, 1982, abandoned.

[30] Foreign Application Priority Data

Feb. 24, 1981 [JP] Japan .................................. 56-26403

[51] Int. Cl.$^3$ ............................................. C08G 69/44
[52] U.S. Cl. ..................................... 528/125; 528/126; 528/128; 528/172; 528/179; 528/182; 528/183; 528/185
[58] Field of Search ............... 528/125, 126, 128, 172, 528/183, 179, 182, 185

[56] References Cited

U.S. PATENT DOCUMENTS

| | | | |
|---|---|---|---|
| 3,272,774 | 9/1966 | Moyer, Jr. ............................ | 528/183 |
| 3,575,928 | 4/1971 | Lenz et al. ........................... | 528/183 |
| 3,859,251 | 1/1975 | Kuhfuss et al. ..................... | 528/183 |
| 4,272,625 | 6/1981 | McIntyre et al. ................... | 528/183 |

Primary Examiner—Lester L. Lee
Attorney, Agent, or Firm—Armstrong, Nikaido, Marmelstein & Kubovcik

[57] ABSTRACT

A polyesteramide having structural units of the general formula:

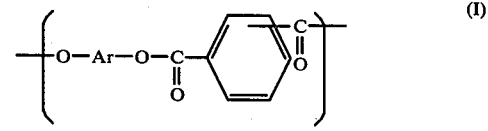

wherein Ar is a bivalent aromatic group comprising at least 10% by mole of a group having the following formula:

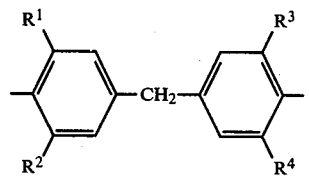

in which $R^1$, $R^2$, $R^3$ and $R^4$ are the same or different and each is methyl group or ethyl group, and structural units of the general formula:

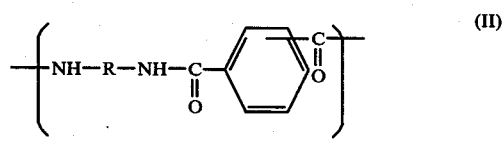

wherein R is a bivalent organic group. At least 10% by mole of a bifunctional phenol compound to be used is a tetraalkylbisphenol-F, and whereby the obtained polyesteramide has improved hydrolysis resistance and electric characteristic with an excellent heat resistance.

13 Claims, 7 Drawing Figures

POLYESTERAMIDE AND PROCESS FOR PREPARING THE SAME

CROSS-REFERENCE TO RELATED APPLICATION

This is a continuation-in-part of application Ser. No. 350,228 filed on Feb. 19, 1982 and now abandoned.

BACKGROUND OF THE INVENTION

The present invention relates to a polyesteramide and a process for the preparation thereof, and more particularly to a polyesteramide containing a 3,3',5,5'-tetraalkylbisphenol F as a bisphenol component in an aromatic polyester portion.

Known polyesteramides have been usually prepared by using bisphenol A as a dihydroxy compound. However, these polyesteramides have a large problem in water resistance, particularly in hydrolysis resistance. Therefore, they reveal defects under a high humidity atmosphere such as cleavage of the polymer chain and lowering of physical properties or electric insulation due to moisture absorption.

It is an object of the present invention to provide a polyesteramide having excellent heat resistance, chemical resistance and electric characteristic.

A further object of the invention is to provide a polyesteramide useful as film, sheet and molding materials.

Another object of the invention is to provide a process for preparing a polyesteramide.

These and other objects of the present invention will become apparent from the description hereinafter.

SUMMARY OF THE INVENTION

It has been found that the hydrolysis resistance and the electric characteristic at a high humidity of a polyesteramide can be improved by using at least 10% by mole of a 3,3',5,5'-tetraalkylbisphenol F as a bisphenol component.

In accordance with the present invention, there is provided a polyesteramide comprising (a) structural units of the general formula (I):

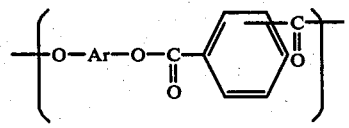

wherein Ar is a bivalent aromatic group comprising at least 10% by mole of a group of the following formula:

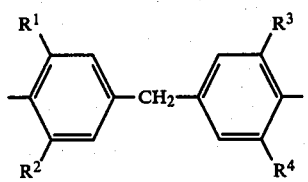

in which $R^1$, $R^2$, $R^3$ and $R^4$ are the same or different and each is methyl group or ethyl group, and (b) structural units of the general formula (II):

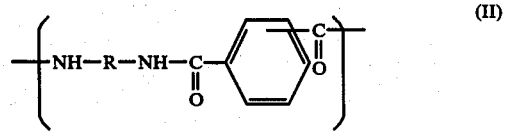

wherein R is a bivalent organic group.

The polyesteramide can be readily prepared by utilizing a phase transfer reaction.

DETAILED DESCRIPTION

Figure 1:
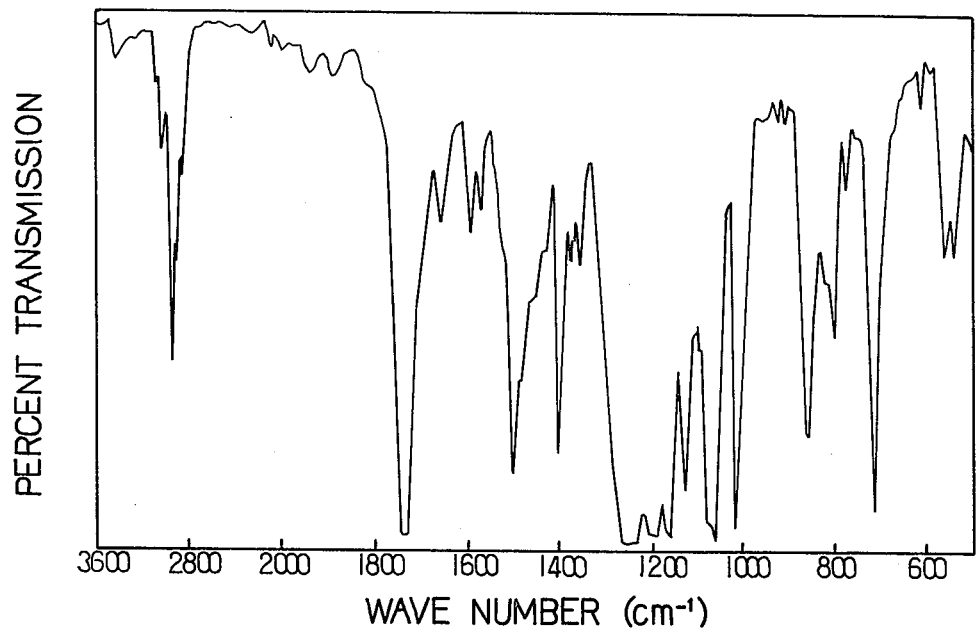
FIGS. 1 to 7 are infrared absorption spectrums of the polyesteramide resins of the present invention.

The polyesteramide of the present invention is prepared by dissolving a bifunctional phenol compound in an aqueous solution of an alkali metal hydroxide such as potassium or sodium hydroxide, reacting the alkali metal salt of the phenol compound with an excess amount of an acid dichloride, and then reacting the residual unreacted acid dichloride and the acid chloride in the produced polymer ends with a diamine compound. Preferably, the reaction is carried out in the presence of a phase transfer catalyst, since a polyesteramide having a high molecular weight can be obtained in high yields by the reaction at a low temperature for a shortened period of time.

In case of employing the phase transfer catalyst, the reaction is carried out by employing an organic solvent. Any organic solvents which are immiscible with water and are inert to the reaction can be employed in the present invention. Examples of the organic solvent are, for instance, halogenated aliphatic hydrocarbons such as methylene chloride and chloroform, aromatic hydrocarbons such as toluene and xylene, halogenated aromatic hydrocarbons such as chlorobenzene and o-dichlorobenzene, and the like. These solvents may be employed alone or in admixture thereof, and may be present in the reaction system in all proportions.

The acid dichloride is desired to be an aromatic compound from the viewpoint of the heat resistance of the obtained polymer. In the present invention, terephthaloyl chloride and isophthaloyl chloride are preferably employed as an acid dichloride. They may be employed alone or in admixture thereof. The chemical resistance is improved by the introduction of amide groups into the polymer, as compared with a polyester resin containing no amide group, and for this purpose, the amide groups can be introduced into the polymer in all proportions. The amount of the acid dichloride is determined according to the desired properties of the produced polyesteramide. The acid dichloride is usually employed in an amount of 0.1 to 100% by mole excess, preferably 1 to 50% by mole excess, based on the metal salt of a bifunctional phenol compound. It is of course possible to employ the acid dichloride in a larger excess amount than the above range, but in case of a certain kind of monomers, carboxyl group is produced by hydrolysis of the acid dichloride during the reaction and a polymer having a high molecular weight is hard to obtain. When the excess amount of the acid dichloride to be reacted subsequently with a diamine is less than 0.1% by mole, it is hard to improve the chemical resistance.

The bifunctional phenol compound is reacted in the form of a metal salt with the acid dichloride. Alkali metal salts of various bifunctional phenol compounds can be employed. The metal salts employed in the present invention are expressed by the following general formula (III):

 (III)

wherein M and M' are an alkali metal, and Ar is a bivalent aromatic group comprising at least 10% by mole of a group of the following formula:

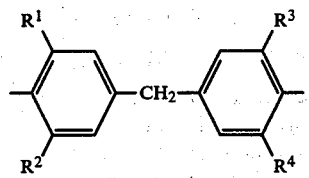

in which $R^1$, $R^2$, $R^3$ and $R^4$ are the same or different and each is methyl group or ethyl group.

In the present invention, it is necessary that at least 10% by mole of the bifunctional phenol compound to be used is a 3,3',5,5'-tetraalkylbisphenol F, namely a bis(3,5-dialkyl-4-hydroxyphenyl)methane, having the following formula:

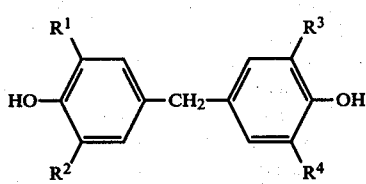

wherein $R^1$, $R^2$, $R^3$ and $R^4$ are as defined above. The moisture absorption and electric characteristic of the obtained polyesteramide can be remarkably improved by the use of the 3,3',5,5'-tetraalkylbisphenol F. Preferable 3,3',5,5'-tetraalkylbisphenol F is 3,3',5,5'-tetramethylbisphenol F and 3,3',5,5'-tetraethylbisphenol F. The tetraalkylbisphenol F may be employed alone or in admixture with other bifunctional phenol compounds. The amount of the tetraalkylbisphenol F is at least 10% by mole, preferably at least 20% by mole, based on the total of the bifunctional phenol compounds used. When the amount of the tetraalkylbisphenol F is less than 10% by mole, the hydrolysis resistance and electric characteristic of the polyesteramide are not improved.

The bifunctional phenol compounds which can be used in combination with the tetraalkylbisphenol F include, for instance, a bivalent phenol compound of the following general formula (IV):

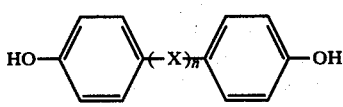 (IV)

wherein X is —C(CH₃)₂—, —SO₂—, —CH₂—, —O—, —S— or —CO—, and n is 0 or 1, and a monocyclic bivalent phenol compound such as resorcine or hydroquinone. These phenol compounds may have a substituent such as CH₃, CH₃CH₂, Cl or Br in their benzene nucleuses.

The reaction of the alkali metal salt of the phenol compound with the acid dichloride is carried out at a temperature of 0° to 100° C., preferably 0° to 50° C. Usually, the reaction is completed in from 5 to 120 minutes.

After the completion of the reaction of the metal salt and the excess acid dichloride, a diamine is subsequently added to the reaction system in amounts necessary for reacting with the unreacted acid dichloride remaining in the reaction system and the terminal acid chloride group of the polymer produced in the foregoing reaction. The amount of the diamine is usually selected from 0.1 to 100% by mole, preferably 1 to 50% by mole, based on the metal salt of the bifunctional phenol compound. The reaction is continued at the same temperature as above, thus causing amide groups to introduce into the polymer.

The diamines employed in the present invention are diamines of the following general formula (V):

 (V)

wherein R is a bivalent organic group, e.g. bivalent organic groups having 1 to 30 carbon atoms. Preferably, the bivalent organic group R in the above general formula (V) includes, for instance, a bivalent hydrocarbon group having 1 to 30 carbon atoms, preferably 2 to 20 carbon atoms,

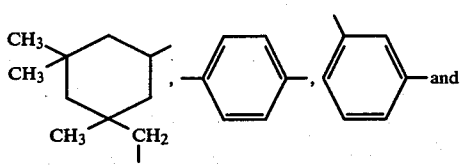

a group of the general formula (IV):

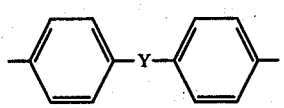 (IV)

wherein Y is —C(CH₃)₂—, —CH₂—, —O—, —SO₂—, —S— or —CO—. In case that the group Y in the above formula (IV) is —SO₂—, —S— or —CO—, especially —SO₂—, the obtained polyesteramide is somewhat poor in water resistance. Typical examples of the diamine are, for instance, an aliphatic diamine such as ethylenediamine, trimethylenediamine or hexamethylene diamine, an alicyclic diamine such as isophorone diamine or diaminocyclohexane, an aromatic diamine such as diaminodiphenylmethane, diaminodiphenylether or meth- and para-phenylenediamine, and the like. The diamines may be employed alone or in admixture thereof. Also, the diamines may be employed in the form of an aqueous solution or an organic solvent solution in any concentrations. The reaction time within the range of 10 to 120 minutes is sufficient.

According to the present invention, the amide groups can be introduced into the polymer in desired all proportions, and moreover since water is employed as one of the reaction solvents and the reaction is conducted in the presence of a phase transfer catalyst, no procedure for removal of a salt is required and the process of the invention is very advantageous.

Catalysts known as phase transfer catalysts can be generally employed in the present invention. Examples of the phase transfer catalyst are, for instance, quaternary ammonium salts such as tetrabutylammonium chloride, trioctylmethylammonium chloride, benzyltributylammonium chloride, benzyltriethylammonium chloride, benzyltrimethylammonium chloride, cetyldimethylbenzylammonium chloride, octyltriethylammonium bromide, decyltriethylammonium bromide, lauryltriethylammonium bromide, cetyltriethylammonium bromide, N-laurylpyridinium chloride, N-laurylpyridinium bromide and N-heptylpyridinium bromide, quaternary phosphonium salt such as tetrabutylphosphonium bromide, triethyloctadecylphosphonium bromide, tetraphenylphosphonium chloride, tetraphenylphosphonium bromide, triphenylmethylphosphonium chloride, triphenylmethylphosphonium bromide, trioctylethylphosphonium bromide and cetyltriethylphosphonium bromide, crown ethers such as 18-crown-6, dibenzo-18-crown-6, dicyclohexyl-18-crown-6, dibenzo-24-crown-8, 12-crown-4, 15-crown-5, cyclohexyl-12-crown-4, tribenzo-18-crown-6, tetrabenzo-18-crown-6 and dibenzo-26-crown-6, and the like. In case of employing the crown ethers as catalysts, the reaction is caused even if the bifunctional phenol compound and the alkali metal hydroxide are employed in the solid state, and accordingly it is not always necessary to employ the phenol compound in the form of an aqueous solution. In other words, the reaction medium may be an organic solvent alone, though the reaction is usually carried out in a medium containing water and a water-immiscible organic solvent.

The amount of the catalyst is selected from 0.1 to 20% by mole, preferably 1 to 10% by mole, based on the bifunctional phenol compound. When the amount is less than the above range, only a polymer having a low molecular weight is produced.

Preferably, after the completion of the polymerization, an aqueous solution of an alkali metal hydroxide such as sodium or potassium hydroxide is added to the reaction system, and after treating for 10 to 60 minutes, an organic acid such as acetic acid or propionic acid, or an inorganic acid such as hydrochloric acid or sulfuric acid is added to the reaction system to make the system neutral or acidic. The produced polymer is recovered in a usual manner. For instance, the polymer can be easily isolated by pouring the reaction mixture to a non-solvent for the polymer such as methanol or acetone. When the polymer is recovered from an alkaline reaction mixture, it is liable to be colored upon heat-drying.

The polyesteramide of the present invention has not only excellent heat resistance and chemical resistance, but also an excellent electric characteristic. It can be employed as a thermosetting resin in various purposes. For instance, the polyesteramide can be employed as film, sheet and molding materials. Various molding processes are adoptable to the polyesteramide of the invention.

The polyesteramide of the present invention has usually a melting point of not less than 250° C. In case of not containing aliphatic diamine units, the melting point of the polyesteramide is not less than 300° C. The polyesteramide having an inherent viscosity of not less than 0.1 dl./g., especially not less than 0.3 dl./g., is desirable for practical use from the viewpoint of the mechanical strength.

The present invention is more specifically described and explained by means of the following Example. It is to be understood that the present invention is not limited to the Examples, and various changes and modifications may be made in the invention without departing from the spirit and scope thereof.

EXAMPLE 1

In 40 ml. of o-dichlorobenzene was dissolved 11 millimoles of terephthaloyl chloride, and to the solution was added 0.2 ml of trioctylmethylammonium chloride.

In 30 ml. of a 1N aqueous solution of sodium hydroxide were dissolved 7.5 millimoles of 2,2-bis(4-hydroxyphenyl)propane (hereinafter referred to as "bisphenol A") and 2.5 millimoles of bis(3,5-dimethyl-4-hydroxyphenyl)methane (hereinafter referred to as "TM bisphenol F"). The obtained aqueous solution of the bisphenol compounds was added to the above aqueous solution of the acid chloride, and was agitated at 0° C. for 10 minutes. Subsequently, 1 millimole of hexamethylenediamine dissolved in 10 ml. of water was added to the reaction mixture, and the mixture was further agitated at 0° C. for 10 minutes.

The water layer was removed from the reaction mixture, and the polymer solution was then washed with water and poured into acetone to isolate the produced polyesteramide. The yield of the polymer was 100%. The polymer had a melting point of 315° C. and an inherent viscosity $[\eta]$ of 0.78 dl./g. (in a phenol/tetrachloroethane mixed solvent of 50:50 by weight).

The infrared absorption spectrum of the obtained polymer is shown in FIG. 1 from which the absorption based on the amide groups is observed at 1,660 cm.$^{-1}$ together with the absorption based on the ester groups at 1,740 cm.$^{-1}$ The polymer was dissolved in m-cresol and a film was prepared by casting. The film was transparent, and had a tensile strength of 850 kg./cm.$^2$ and an elongation of 4%.

EXAMPLE 2

The procedure of Example 1 was repeated except that 12 millimoles of terephthaloyl chloride and 2 millimoles of hexamethylenediamine were employed.

The obtained polyesteramide had a melting point of 322° C. and an inherent viscosity of 0.75 dl./g. (in the phenol/tetrachloroethane mixed solvent).

Figure 2:
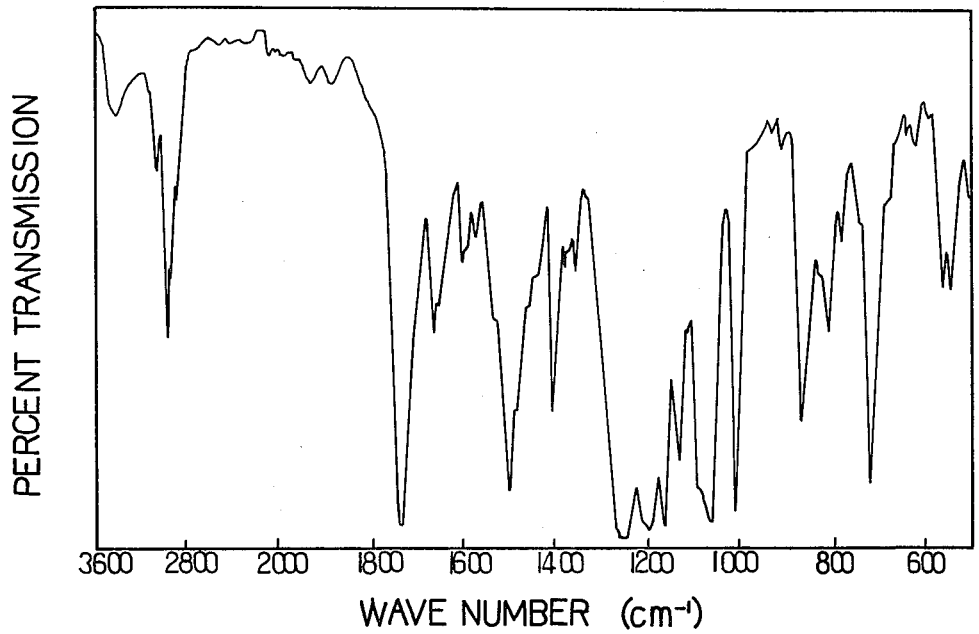

The infrared absorption spectrum of the polymer is shown in FIG. 2.

EXAMPLE 3

The procedure of Example 1 was repeated except that 13 millimoles of terephthaloyl chloride and 3 millimoles of hexamethylenediamine were employed.

The obtained polyesteramide had a melting point of 278° C. and an inherent viscosity of 0.37 dl./g. (in the phenol/tetrachloroethane mixed solvent).

Figure 3:
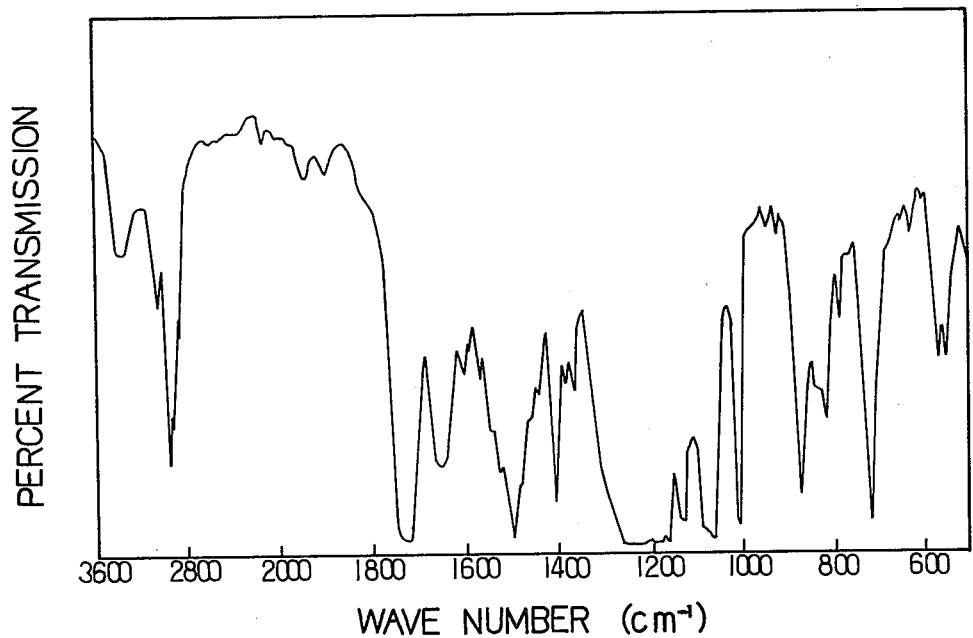

The infrared absorption spectrum of the polymer is shown in FIG. 3.

EXAMPLES 4 to 6

The procedures of Example 1 were repeated except that instead of hexamethylenediamine, isophorone diamine was employed in amounts of 1, 2 and 3 millimoles, respectively.

Figure 4:
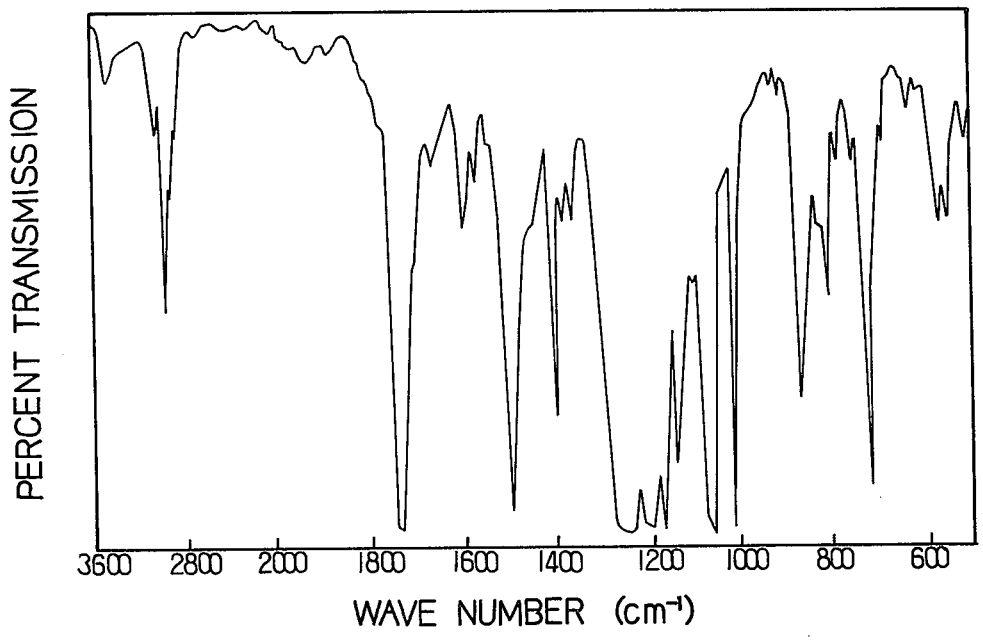
Figure 5:
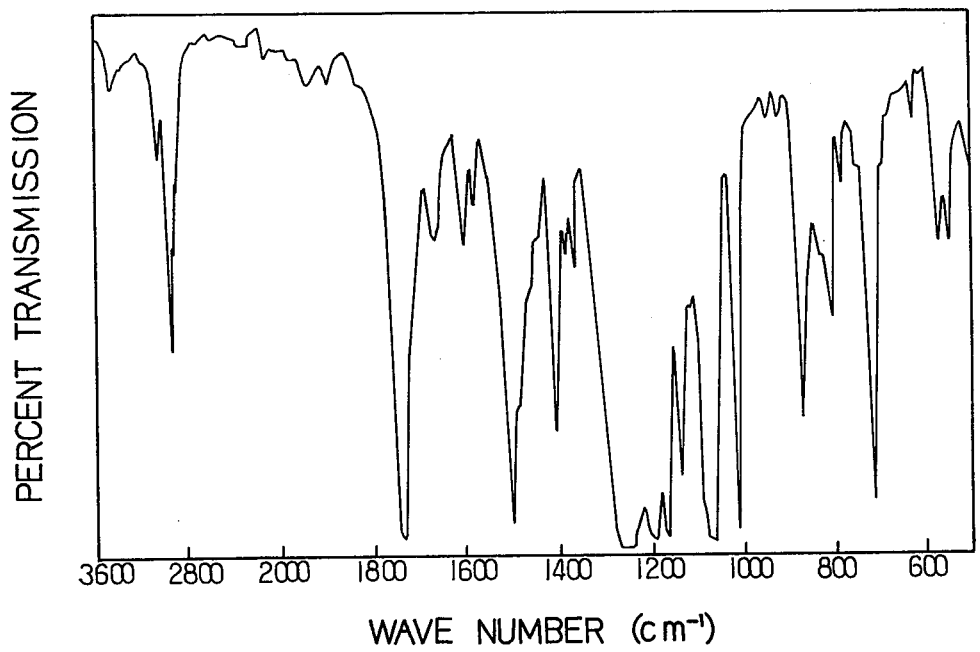
Figure 6:
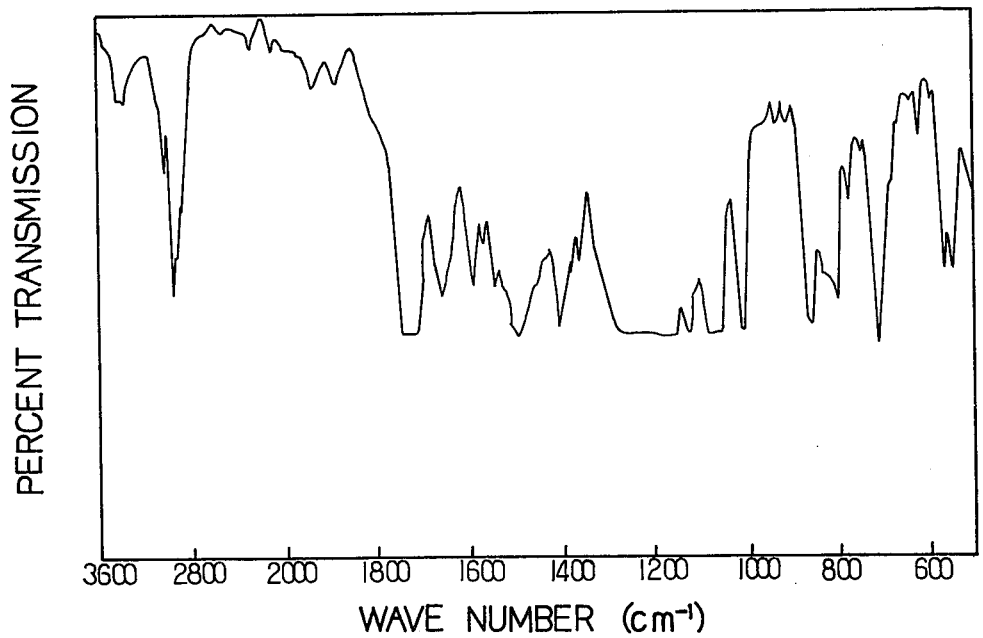

The obtained polyesteramide resins had inherent viscosities of 0.84, 0.52 and 0.46 dl./g. (in the phenol/tetrachloroethane mixed solvent), respectively. The infrared absorption spectrums are shown in FIGS. 4, 5 and 6.

EXAMPLE 7

The procedure of Example 2 was repeated except that 40 ml. of 1,2-dichloroethane was employed as a solvent instead of o-dichlorobenzene.

The obtained polyesteramide had an inherent viscosity of 0.78 dl./g. (in the mixed phenol/tetrachloroethane mixed solvent).

EXAMPLE 8

In 40 ml. of chloroform was dissolved 12 millimoles of terephthaloyl chloride, and to the solution was added 0.2 millimole of trioctylmethylammonium chloride. To the solution was added a solution of 7.5 millimoles of the bisphenol A and 2.5 millimoles of the TM bisphenol F dissolved in 30 ml. of a 1N aqueous solution of sodium hydroxide at 0° C. After agitating the mixture at 0° C. for 15 minutes, a solution of 2 millimoles of 4,4'-diaminodiphenylmethane dissolved in 10 ml. of chloroform was added to the reaction mixture, and the reaction was further continued at 0° C. for 20 minutes with agitation. The reaction mixture was washed with water and poured to acetone to isolate the produced polyesteramide.

Figure 7:
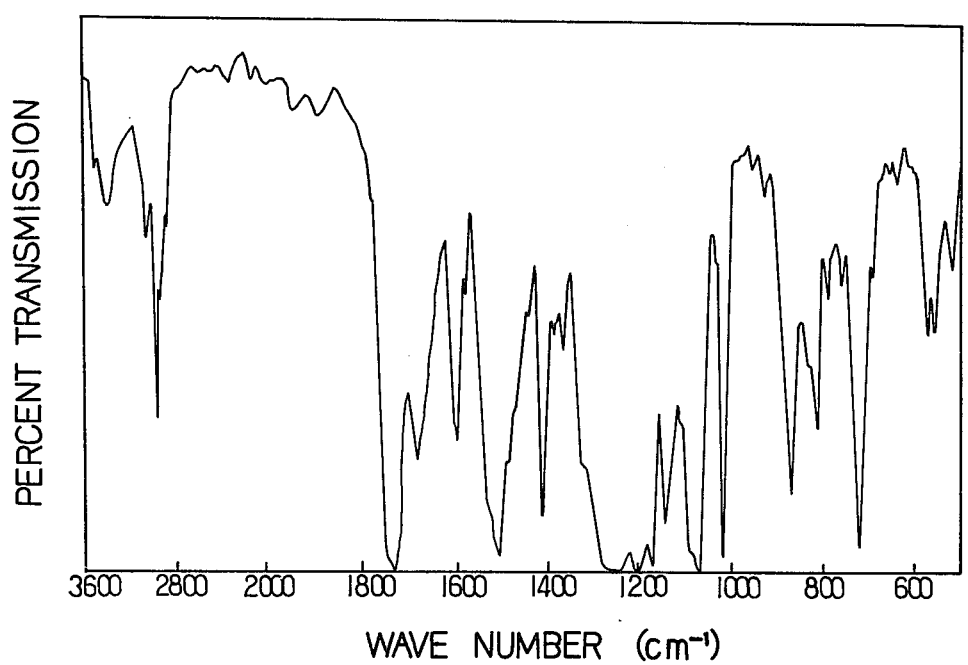

The obtained polyesteramide had an intrinsic viscosity of 0.58 (0.4 g./100 ml. phenol-tetrachloroethane mixed solvent at 30° C.) The infrared absorption spectrum is shown in FIG. 7.

COMPARATIVE EXAMPLE 1

In a flask equipped with a stirrer was charged with 25.5 ml. of distilled water, 25 millimoles (5.6 g.) of bisphenol A, 0.006 g. of sodium bisulfite, 0.1 g. of benzyltrimethylammonium chloride, 2.2 g. of sodium hydroxide and 0.025 g. of p-phenylphenol. With vigorous stirring, 14 millimoles (2.79 g.) of terephthaloyl chloride and 14 millimoles (2.79 g.) of isophthaloyl chloride dissolved in 26.5 g. of methylene chloride was added dropwise to the flask over 1 hour at 25° C. To the flask was then added 3 millimoles (0.32 g.) of 1,6-hexanediamine dissolved in 10 ml. of water. The reaction was further continued at 25° C. for 1 hour. The water layer was removed from the reaction mixture. The residual polymer solution was washed with water and then with 10% hydrochloric acid and poured to isopropanol to isolate the produced polyesteramide.

The polyesteramides obtained in Examples 1 and 4 and Comparative Example 1 were dissolved in m-cresol, respectively, and films were prepared from the solutions by casting. The softening point, moisture absorption and change in volume intrinsic resistivity under a high humidity atmosphere of the films were measured.

The softening point was measured by employing a dynamic viscoelasticity spectrometer made by RHESCA CO.

The moisture absorption was measured by allowing the films to stand at 23° C. and 50% RH for a week and calculating a rate of weight increase.

The electric characteristic was estimated by change in volume intrinsic resistivity. The films were allowed to stand at 40° C. and 90% RH for 3 days, and the volume intrinsic resistivity was measured and compared with that of the original specimens.

The results are shown in Table 1.

TABLE 1

| Polyesteramide | Softening point (°C.) | Moisture absorption (%) | Volume intrinsic resistivity (Ω · cm) | |
|---|---|---|---|---|
| | | | Initial | After 3 days |
| Ex. 1 | 254 | 0.16 | $2 \times 10^{16}$ | $1.4 \times 10^{16}$ |
| Ex. 4 | 268 | 0.14 | $5 \times 10^{16}$ | $4.3 \times 10^{16}$ |
| Com. Ex. 1 | 228–236 | 0.31 | $3 \times 10^{16}$ | $1.8 \times 10^{14}$ |

As shown in Table 1, the polyesteramides of the Examples prepared by using two kinds of bisphenols, namely bisphenol A and tetramethylbisphenol F, as a bifunctional phenol component are low in moisture absorption. Accordingly, they are stable in volume intrinsic resistivity under a high humidity atmosphere and have an excellent electric characteristic with an excellent heat resistance.

What we claim is:

1. A polyesteramide comprising (a) structural units of the general formula (I):

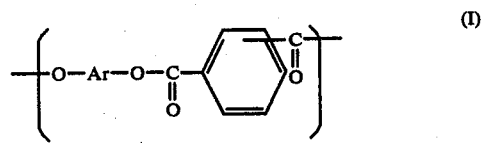

wherein Ar is a bivalent aromatic group comprising at least 10% by mole of a group having the following formula:

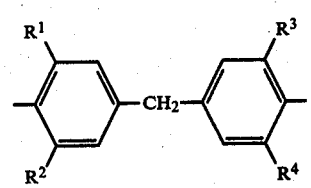

in which $R^1$, $R^2$, $R^3$ and $R^4$ are the same or different and each is methyl group or ethyl group, and (b) structural units of the general formula (II):

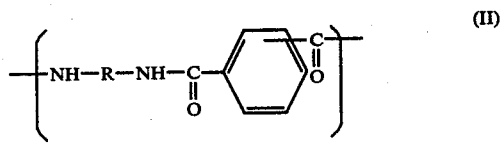

wherein R is a bivalent organic group.

2. The polyesteramide of claim 1, wherein the molar ratio of the structural units (II)/(I) is from 0.1/100 to 100/100.

3. The polyesteramide of claim 1, wherein the molar ratio of the structural units (II)/(I) is from 1/100 to 50/100.

4. The polyesteramide of claim 1, having an inherent viscosity [η] of not less than 0.1 dl./g.

5. The polyesteramide of claim 1, wherein the group Ar in the formula (I) consists of at least 10% by mole of a group having the following formula:

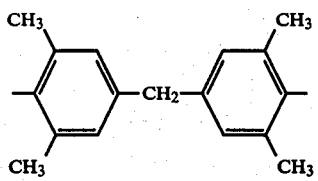

and the residual amount of a group having the following formula:

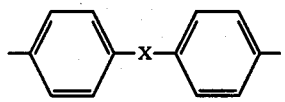

wherein X is —C(CH₃)₂—, —SO₂—, —CH₂—, —O—, —S— or —CO—, provided that the benzene nucleuses may have a substitutent selected from the group consisting of CH₃, CH₃CH₂, Cl and Br.

6. The polyesteramide of claim 1, wherein the group Ar in the formula (I) consists of at least 10% by mole of a group having the following formula:

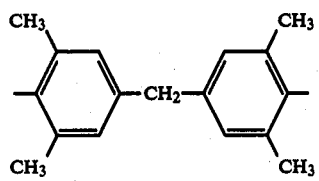

and the residual amount of a group having the following formula:

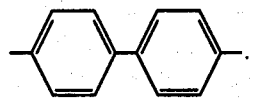

7. The polyesteramide of claim 1, wherein the group Ar in the formula (I) consists of at least 10% by mole of a group having the following formula:

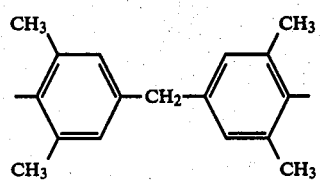

and the residual amount of a group having the following formula:

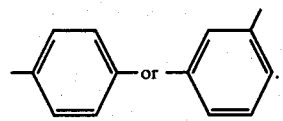

8. The polyesteramide of claim 1, wherein the group R in the formula (II) is a bivalent hydrocarbon group having 1 to 30 carbon atoms.

9. The polyesteramide of claim 1, wherein the group R in the formula (II) is a bivalent group selected from the group consisting of a hydrocarbon group having 2 to 20 carbon atoms,

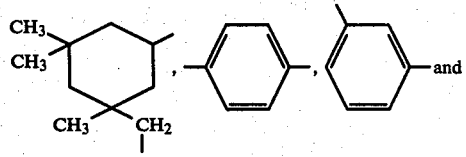

a group of the general formula (IV):

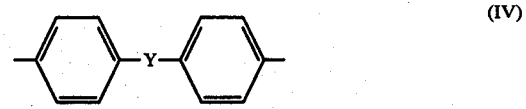

wherein Y is —C(CH₃)₂—, —CH₂—, —O—, —SO₂—, —S— or —CO—.

10. A process for preparing a polyesteramide which comprises reacting an alkali metal salt of a bifunctional phenol compound having the general formula (III):

MO—AR—OM'   (III)

wherein M and M' are an alkali metal, and Ar is a bivalent aromatic group comprising at least 10% by mole of a group having the following formula:

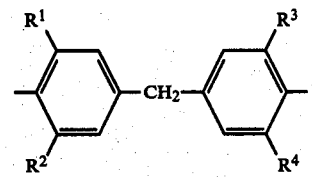

in which R¹, R², R³ and R⁴ are the same or different and each is methyl group or ethyl group, with 0.1 to 100% by mole excess of, based on the phenol compound, an acid dichloride selected from the group consisting of terephthaloyl chloride and isophthaloyl chloride, and reacting the remaining acid dichloride with 0.1 to 100% by mole of, based on the phenol compound, a diamine compound having the general formula (V):

NH₂—R—NH₂   (V)

wherein R is a bivalent organic group, to give a polyesteramide containing structural units of the general formula (I):

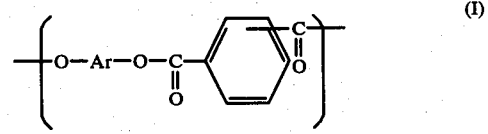

wherein Ar is as defined above, and structural units of the general formula (II):

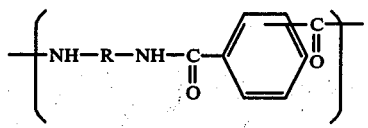

wherein R is as defined above.

11. The process of claim 10, wherein the excess amount of the acid dichloride and the amount of the diamine are selected from 1 to 50% by mole based on the phenol compound, respectively.

12. The process of claim 10, wherein the alkali metal salt of the bifunctional phenol compound is an aqueous solution of an alkali metal in which the bifunctional phenol compound is dissolved, and the reaction is conducted in the presence of a phase transfer catalyst.

13. The process of claim 10, wherein the phase transfer catalyst is a member selected from the group consisting of quaternary ammonium salts, quaternary phosphonium salts and crown ethers.

* * * * *